United States Patent Office 2,729,687
Patented Jan. 3, 1956

2,729,687

PROCESS FOR BROMINATING HALOGENATED METHANES

John D. Sterling, Glassboro, N. J., assignor to E. I. du Pont de Nemours & Company, Wilmington, Del., a corporation of Delaware No Drawing. Application December 6, 1951, Serial No. 260,319

10 Claims. (Cl. 260—653)

This invention relates to a novel process for brominating halogenated methanes which contain at least one chlorine atom.

A common method for the preparation of bromohydrocarbons involves the reaction of a hydrocarbon with elemental bromine, wherein one molecule of hydrogen bromide is formed for each bromine atom that is introduced into the hydrocarbon molecule. Such method, therefore, utilizes only one-half of the bromine. When such method is applied to chlorinated hydrocarbons, the main reaction is the replacement of hydrogen by bromine with little or no replacement of chlorine by bromine, it being difficult to cause bromine to replace chlorine in the molecule in satisfactory yields. Accordingly, it has been a problem to find a bromination process which would utilize all of the available bromine, which would enable chlorine to be replaced by bromine in satisfactory yields, and which could be operated conveniently on a commercial scale.

More recently, it has been proposed to replace the chlorine in chlorinated organic compounds with bromine by reacting such compounds with hydrogen bromide in the liquid phase and in the presence of a catalyst. Such process has the disadvantage of requiring a catalyst which increases the cost of the process and which must be separated from the product. Also, such process cannot conveniently be operated in a continuous manner.

It is an object of my invention to provide a non-catalytic process for brominating halogenated methanes containing at least one chlorine atom. Another object is to provide such a process wherein all of the bromine is utilized. A further object is to provide a process which is particularly well adapted for operation in a continuous manner and which is simple and economical to operate. Other objects are to advance the art. Still other objects will appear hereinafter.

The above and other objects may be accomplished in accordance with my invention which consists essentially of brominating a halogenated methane of the formula CClXYZ, wherein X represents an element of the group consisting of H, Cl and Br and each of Y and Z represents an element of the group consisting of H, Cl, Br and F, by passing a mixture of vapors of at least one of such halogenated methanes and a brominating agent of the group consisting of HBr and mixtures of HBr and $Br_2$ through an inert tube heated to a temperature of from 500° C. to about 650° C. with a contact time of from about 2 to about 25 seconds, and then collecting and separating the reaction products.

By such process, the bromine of the hydrogen bromide replaces the chlorine in the halogenated methane and the chlorine is released as hydrogen chloride. The reaction takes place readily with satisfactory yields of brominated compounds. The products are readily separated by distillation, and unreacted hydrogen bromide and insufficiently brominated material can be recycled, whereby all of the available bromine is utilized. No catalysts or solvents are employed and, therefore, the products do not contain, or have to be separated from, catalysts or solvents. The process is simple, easy and economical to operate and is particularly well adapted to be operated in a continuous manner. The brominated products are useful for such diversified purposes as fire extinguishing agents, as refrigerants, and as intermediates for the preparation of other organic compounds.

The halogenated methanes, which are to be employed as starting materials in accordance with my invention, may be represented by the formula CClXYZ, wherein X represents an element of the group consisting of H, Cl and Br and each of Y and Z represents an element of the group consisting of H, Cl, Br and F. Preferably, one or both of Y and Z is F. Representative halogenated methanes, which have been successfully brominated by my process, are $CHClF_2$, $CCl_2F_2$, $CCl_3F$, $CBrClF_2$, $CH_2Cl_2$ and $CH_3Cl$. Chlorofluoromethanes are, in general, more readily available and cheaper than fluoromethanes and hence my process is particularly valuable for producing bromofluoromethanes from such chlorofluoromethanes. The bromofluoromethanes, particularly $CBr_2F_2$, are especially valuable as fire extinguishing agents and as refrigerants. Most preferably, my process is directed to the production of $CHBrF_2$ and $CBr_2F_2$ from $CHClF_2$ and $CBrClF_2$.

The reaction tube should be inert. That is, it should be made of materials which do not affect the reaction and which do not readily react with HBr or HCl at the high temperatures employed. Representative of such inert materials are nickel, quartz, platinum, silver, sintered alumina, carbon, graphite and heat resisting glass such as "Pyrex."

The inert reaction tube should be heated at a temperature of 500° C. to about 650° C. For best results, the tube should be heated to a temperature of from about 575° C. to about 625° C. The conversions decrease rapidly as the temperatures are lowered and, at temperatures below 500° C., the reaction is slow if it takes place at all. If the temperatures are increased materially above 650° C., competing side reactions, such as decomposition, disproportionation, dehalogenation and dehydrohalogenation are increased, seriously affecting the yields of the desired products.

The process will, ordinarily, be carried out at substantially atmospheric pressure. However, higher or lower pressures may be used as long as the reactants and products are in the vapor phase at the pressure and temperature employed.

The contact time may vary from about 2 seconds to about 25 seconds. The contact time is the time during which the mixture of gases is at approximately the reaction temperatures. It is calculated by assuming that the gases are at the reaction temperature in two-thirds of the heated length of the tube. The molar volume of such portion of the tube is calculated at the selected reaction temperature. The contact time is then the quotient of the molar volume divided by the mols of the reactants which are fed through the tube in each second. The contact time, for producing the optimum results, will vary with the reactivity of the halogenated methane which is to be brominated and, usually, will be from about 2 to about 15 seconds. When $CHClF_2$ and $CBrClF_2$ are brominated at a temperature of from about 575° C. to about 625° C., the contact time will preferably be from about 2 seconds to about 5 seconds.

The ratio of hydrogen bromide to halogenated methane may be widely varied and will depend upon the results desired and upon economic considerations. As a practical consideration, a minimum of about 0.25 mol of HBr will be employed for each mol of halogenated methane. In general, the ratio of HBr to halogenated methane will be about 1 mol of HBr per atom of chlorine to be replaced. Lower ratios of HBr will result in decreased organic conversions and increased HBr conversions, and decrease in the quantity of HBr to be recycled. On the other hand, higher ratios of HBr result in increased organic conversions and decreased HBr conversions, and require the recycling of larger amounts of HBr. Very large excesses of HBr may render the recycling thereof uneconomical. The optimum ratio is an economic problem, depending upon the interrelation of contact time, temperature, reactivity of the halogenated methane, and the concentrations, which will vary from one halogenated methane to another.

When a halogenated methane contains hydrogen and chlorine and it is desired to replace both with bromine, my process can be employed in conjunction with bromination by elemental bromine. The halogenated methane (such as $CHClF_2$) may first be reacted with HBr to replace the desired number of chlorine atoms, and the resulting brominated methane (such as $CHBrF_2$) may be reacted with $Br_2$ in a similar tube under similar conditions to replace the hydrogen with bromine. The HBr, produced in the second tube, can be separated from the $CBr_2F_2$ and the unreacted materials and recycled to the first operation. Alternatively, the halogenated methane (such as $CHClF_2$) can be first reacted with $Br_2$ to replace the hydrogen with bromine, and the resulting HBr and brominated methane (such as $CBrClF_2$) can be separated from the reaction mixture and passed through a tube according to the process of my invention.

A particularly desirable method, for replacing both hydrogen and chlorine in a halogenated methane such as $CHClF_2$, is to introduce $Br_2$ into the tube with the halogenated methane and the HBr in my process, separating the desired products and the HCl from the reaction mixture, and recycling the rest, if desired, with additional amounts of HBr, $Br_2$ and halogenated methane. The amount of $Br_2$ employed will depend upon the number of hydrogen atoms to be replaced and the desired yield of compounds having the hydrogen replaced by bromine. By varying the ratios of HBr and $Br_2$ to halogenated methane, it is possible to obtain mixtures of almost any desired composition. For example, by so brominating $CHClF_2$, it is possible to obtain mixtures of $CBr_2F_2$, $CBrClF_2$ and $CHBrF_2$ in varying proportions, or to eventually convert all of the $CHClF_2$ to $CBr_2F_2$ by recycling the $CBrClF_2$, $CHBrF_2$ and unreacted materials together with additional amounts of HBr and $Br_2$. By continuously passing the halogenated methane, HBr and $Br_2$ through the tube together with the continuously recycled materials, there is obtained a continuous process for producing the desired product or products, such as $CBr_2F_2$. Preferably, when mixtures of HBr and $Br_2$ are employed each will be in a ratio of from about 0.25 mol to about 3 mols for each mol of halogenated methane.

In order to more clearly illustrate my invention, preferred modes of carrying it into effect, and the advantageous results to be obtained thereby, the following examples are given, which were carried out at substantially atmospheric pressure:

EXAMPLE 1

Chlorodifluoromethane, at the rate of 1.6 g./min., and hydrogen bromide, at the rate of 2.3 g./min. (a ratio of 1.5 mols of HBr to each mol of $CHClF_2$), were metered by rotameters and the gaseous mixture was passed through a quartz tube (2 inches in diameter) 18 inches of which was electrically heated to 600° C. The contact time was 10.5 seconds. The reaction products were scrubbed with water and an aqueous solution of 10% $Na_2CO_3$–10% $Na_2SO_3$, and then dried with calcium chloride. The gas was condensed in a receiver cooled by an acetone-solid carbon dioxide bath. The composition of the product, determined by fractional distillation and infrared analysis, was about 62 mol per cent of $CHBrF_2$, about 4 mol per cent of $CBrClF_2$, and about 34 mol per cent of unreacted $CHClF_2$.

Other examples employed the method of Example 1, and the data from representative examples are presented in the following Table I:

Table I

| Example Number | Organic Starting Material | Temp., °C. | Contact time (seconds) | HBr : organic mol ratio | Product, mol per cent (Remainder starting material) |
|---|---|---|---|---|---|
| 2 | $CHClF_2$ | 600 | 3.7 | 1.29 | $CHBrF_2$=47%. $CBrClF_2$=2%. |
| 3 | $CCl_2F_2$ | 600 | 22 | 0.8 | $CBr_2F_2$=5%. $CBrClF_2$=5%. |
| 4 | $CCl_3F$ | 600 | 3 | 1.2 | $CBrCl_2F$ and $CBr_2ClF$=25%. |
| 5 | $CBrClF_2$ | 600 | 11 | 2 | $CBr_2F_2$=25%. |
| 6 | $CH_2Cl_2$ | 500 | 25 | 0.5 | $CH_2ClBr$=10%. |

EXAMPLE 7

An equimolar mixture of $CHClF_2$, $CHBrF_2$ and $CBrClF_2$ (total 0.08 mol/min.) was passed with HBr (0.04 mol/min.) and $Br_2$ (0.02 mol/min.) through the quartz tube of Example 1 at 600° C. and a contact time of 7 seconds. The product was washed and dried as described in Example 1, and was found to contain approximately 23 mol per cent $CBr_2F_2$, 15 mol per cent $CHClF_2$, 36 mol per cent $CHBrF_2$ and 26 mol per cent $CBrClF_2$, as determined by infrared analysis.

In a similar run, the $CBr_2F_2$ was removed by fractional distillation and the remaining compounds recycled with $CHClF_2$ for further reaction with HBr and $Br_2$.

The preceding Examples 1 to 5 and 7 were also run successfully at 500° C. but with materially lower conversions. For example, when $CCl_2F_2$ was so brominated at 550° C., the conversion was 3%.

It will be understood that the preceding examples are given solely for illustrative purposes and that variations can be made therein without departing from the spirit or scope of my invention. Other halogenated methanes and mixtures of halogenated methanes, within the class specified, may be substituted for those of the examples. Also, the ratios of brominating agents to halogenated methanes, the temperatures, the pressures and the contact times may be varied within the limits and according to the principles hereinbefore set forth.

Certain other related halogenated compounds were also successfully brominated by passing vapors thereof with HBr through a heated tube, some requiring much higher temperatures. Such halogenated compounds, the conditions employed, and the results obtained are shown in the following Table II:

Table II

| Starting Material | Temp., (° C.) | Contact time (seconds) | HBr: organic (mol ratio) | Product, mol percent (Remainder starting material) |
|---|---|---|---|---|
| $CClF_3$ | 800 | 7 | 1.0 | $CBrF_3$=17%. $CHF_3$=10%. |
| $CClF_2$—$CClF_2$ | 750 | 34 | 1.3 | $CBrF_2CBrF_2$=10%. $CBrClF_2$ and $CBrF_3$=30%. |
| $CClF_2CCl_2F$ | 600 | 5 | 1 | $CBrClFCClF_2$ and $CBrClFCBrF_2$=25%. |
| $CF_2$=$CCl_2$ | 500 | 25 | 0.9 | $CClBr$=$CF_2$=25%. Higher boiling material=25%. |

From the preceding disclosure, it is apparent that I have provided a novel process for brominating halogenated methanes which is simple, easy and economical to operate. Such process does not involve the use of catalysts or solvents and utilizes all of the available bromine. It produces satisfactory yields of the desired products and, through recycling, results in substantially complete conversion of the starting materials to the desired products.

Such process is particularly adapted for continuous operation. Therefore, it is apparent that my invention constitutes a valuable advance in, and contribution to, the art.

I claim:
1. The process of brominating a halogenated methane of the formula CClXYZ wherein X represents an element of the group consisting of H, Cl and Br and each of Y and Z represents an element of the group consisting of H, Cl, Br and F wherein chlorine in the halogenated methane is replaced by bromine, which consists essentially of passing a mixture of vapors of at least one of such halogenated methanes and a brominating agent of the group consisting of HBr and mixtures of HBr and $Br_2$ through an inert tube heated to a temperature of from 500° C. to about 650° C. with a contact time of from about 2 to about 25 seconds, the HBr being in a ratio of from about 0.5 mol to about 3 mol for each mol of halogenated methane and the $Br_2$, when present, being in a ratio of from about 0.25 mol to about 3 mol for each mol of halogenated methane, and then collecting and separating the reaction products.

2. The process of brominating a halogenated methane of the formula CClXYZ wherein Z represents an element of the group consisting of H, Cl and Br and each of Y and Z represents an element of the group consisting of H, Cl, Br and F wherein chlorine in the halogenated methane is replaced by bromine, which consists essentially of passing a mixture of vapors of at least one of such halogenated methanes and a brominating agent of the group consisting of HBr and mixtures of HBr and $Br_2$ through an inert tube heated to a temperature of from about 575° C. to about 625° C. with a contact time of from about 2 to about 25 seconds, the HBr being in a ratio of from about 0.5 mol to about 3 mol for each mol of halogenated methane and the $Br_2$, when present, being in a ratio of from about 0.25 mol to about 3 mol for each mol of halogenated methane, and then collecting and separating the reaction products.

3. The process of brominating a halogenated methane of the formula CClXYZ wherein Z represents an element of the group consisting of H, Cl and Br and each of Y and Z represents an element of the group consisting of H, Cl, Br and F wherein chlorine in the halogenated methane is replaced by bromine, which consists essentially of passing a mixture of vapors of at least one of such halogenated methanes and HBr through an inert tube heated to a temperature of from about 575° C. to about 625° C. with a contact time of from about 2 to about 25 seconds, the HBr being in a ratio of from about 0.5 mol to about 3 mol for each mol of halogenated methane, and then collecting and separating the reaction products.

4. The process of brominating $CHClF_2$ wherein the chlorine in the $CHClF_2$ is replaced by bromine which consists essentially of passing a mixture of vapors of $CHClF_2$ and a brominating agent of the group consisting of HBr and mixtures of HBr and $Br_2$ through an inert tube heated to a temperature of from about 575° C. to about 625° C. with a contact time of from about 2 to about 15 seconds, the HBr being in a ratio of from about 0.5 mol to about 3 mol for each mol of $CHClF_2$ and the $Br_2$, when present, being in a ratio of from about 0.25 mol to about 3 mol for each mol of $CHClF_2$, and then collecting and separating the reaction products.

5. The process of brominating $CHClF_2$ wherein the chlorine in the $CHClF_2$ is replaced by bromine which consists essentially of passing a mixture of vapors of $CHClF_2$ and HBr through an inert tube heated to a temperature of from 500° C. to about 650° C. with a contact time of from about 2 to about 25 seconds, and then collecting and separating the reaction products.

6. The process of brominating $CHClF_2$ wherein the chlorine in the $CHClF_2$ is replaced by bromine which consists essentially of passing a mixture of vapors of $CHClF_2$ and HBr through an inert tube heated to a temperature of from about 575° C. to about 625° C. with a contact time of from about 2 to about 15 seconds, the HBr being in a ratio of from about 0.5 mol to about 3 mol for each mol of $CHClF_2$, and then collecting and separating the reaction products.

7. The process of brominating $CHClF_2$ wherein the chlorine in the $CHClF_2$ is replaced by bromine which consists essentially of passing a mixture of vapors of $CHClF_2$ and a mixture of HBr and $Br_2$ through an inert tube heated to a temperature of from about 575° C. to about 625° C. with a contact time of from about 2 to about 15 seconds, the HBr and the $Br_2$ each being in a ratio of from about 0.25 mol to about 3 mol for each mol of $CHClF_2$, and then collecting and separating the reaction products.

8. The process of brominating $CBrClF_2$ wherein the chlorine in the $CBrClF_2$ is replaced by bromine which consists essentially of passing a mixture of vapors of $CBrClF_2$ and HBr through an inert tube heated to a temperature of from 500° C. to about 650° C. with a contact time of from about 2 to about 25 seconds, and then collecting and separating the reaction products.

9. The process of brominating $CBrClF_2$ wherein the chlorine in the $CBrClF_2$ is replaced by bromine which consists essentially of passing a mixture of vapors of $CBrClF_2$ and HBr through an inert tube heated to a temperature of from about 575° C. to about 625° C. with a contact time of from about 2 to about 15 seconds, the HBr being in a ratio of from about 0.5 mol to about 3 mol for each mol of $CBrClF_2$, and then collecting and separating the reaction products.

10. The process of brominating a mixture of $CHClF_2$, $CHBrF_2$ and $CBrClF_2$ wherein the chlorine in a substantial portion of the members of the mixture is replaced by bromine, which consists essentially of passing vapors of such mixture with HBr and $Br_2$ through an inert tube heated to a temperature of from about 575° C. to about 625° C. with a contact time of from about 2 to about 15 seconds, the HBr and the $Br_2$ each being in a ratio of from about 0.25 mol to about 3 mol for each mol of such halogenated methanes, and then collecting and separating the reaction products.

References Cited in the file of this patent

UNITED STATES PATENTS

| | | |
|---|---|---|
| 1,891,415 | Harlow et al. | Dec. 20, 1932 |
| 2,120,675 | Nutting et al. | June 14, 1938 |
| 2,347,000 | Scherer et al. | Apr. 18, 1944 |
| 2,553,518 | Lake et al. | May 15, 1951 |
| 2,639,301 | Ruh et al. | May 19, 1953 |
| 2,644,845 | McBee | July 7, 1953 |